(12) United States Patent
Kusama et al.

(10) Patent No.: US 11,818,635 B2
(45) Date of Patent: *Nov. 14, 2023

(54) INFORMATION PROCESSING SYSTEM, PROGRAM, AND INFORMATION PROCESSING METHOD

(71) Applicant: TOYOTA JIDOSHA KABUSHIKI KAISHA, Toyota (JP)

(72) Inventors: Eiichi Kusama, Anjo (JP); Masatoshi Hayashi, Nisshin (JP); Hisanori Mitsumoto, Hadano (JP); Kuniaki Jinnai, Nagoya (JP); Makoto Akahane, Tokyo (JP); Yuriko Yamaguchi, Tokyo (JP); Daisuke Kato, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 66 days.

This patent is subject to a terminal disclaimer.

(21) Appl. No.: 17/500,046

(22) Filed: Oct. 13, 2021

(65) Prior Publication Data

US 2022/0067355 A1 Mar. 3, 2022

Related U.S. Application Data

(63) Continuation of application No. 16/687,797, filed on Nov. 19, 2019, now Pat. No. 11,170,207.

(30) Foreign Application Priority Data

Dec. 14, 2018 (JP) ................................ 2018-234145

(51) Int. Cl.
*H04W 4/48* (2018.01)
*H04W 4/44* (2018.01)
(Continued)

(52) U.S. Cl.
CPC ............. *H04W 4/48* (2018.02); *G06F 18/211* (2023.01); *G06V 20/56* (2022.01); *G06V 20/58* (2022.01);
(Continued)

(58) Field of Classification Search
CPC .......... G06K 9/00845; G06K 9/00335; G06K 9/00805; G06K 2009/00738;
(Continued)

(56) References Cited

U.S. PATENT DOCUMENTS

| 10,762,646 B2 * | 9/2020 | Modestine ......... H04N 5/23241 |
| 2015/0220798 A1 * | 8/2015 | Miyano ................ G06V 40/103 382/115 |

(Continued)

FOREIGN PATENT DOCUMENTS

JP 2017-211888 A 11/2017

OTHER PUBLICATIONS

Kusama, Eiichi, et al., U.S. Appl. No. 16/687,797, filed Nov. 19, 2019.

(Continued)

*Primary Examiner* — Nizar N Sivji
(74) *Attorney, Agent, or Firm* — Sughrue Mion, PLLC (57) ABSTRACT

An information processing system includes a plurality of vehicle; and a server that is able to communicate with the plurality of vehicles. Each of the plurality of vehicles performs: generating a moving image in which a person outside the vehicle appears; and transmitting the moving image and an imaging time and an imaging position of the moving image to the server. The server performs: specifying two or more target moving images in which the same person appears out of a plurality of moving images received from the plurality of vehicles; detecting behavior of the person from the two or more target moving images; estimating (Continued)

attribute information of the person based on the detected behavior; and transmitting the estimated attribute information of the person and the imaging time and the imaging position of at least one of the target moving images to a client.

15 Claims, 6 Drawing Sheets

(51) Int. Cl.
    *G06V 40/20*     (2022.01)
    *G06V 20/56*     (2022.01)
    *G06V 40/10*     (2022.01)
    *G06F 18/211*     (2023.01)
    *G06V 20/58*     (2022.01)

(52) U.S. Cl.
    CPC ............ *G06V 40/10* (2022.01); *G06V 40/103* (2022.01); *G06V 40/20* (2022.01); *H04W 4/44* (2018.02)

(58) Field of Classification Search
    CPC ....... G06K 9/00362; G06K 2009/3291; G06K 9/00302; G06K 9/6228; G06K 9/00791; G06K 9/00369; H04W 84/005; H04W 4/40; H04W 4/46; H04W 4/027; H04W 4/44; H04W 4/48
    See application file for complete search history.

(56) References Cited

U.S. PATENT DOCUMENTS

| | | | |
|---|---|---|---|
| 2016/0155004 A1* | 6/2016 | Shiraishi | G08G 1/20 348/77 |
| 2018/0137372 A1* | 5/2018 | Newman | G06V 40/103 |
| 2018/0184244 A1* | 6/2018 | Bestor | G06V 20/52 |
| 2018/0316901 A1* | 11/2018 | Carrier | G06V 20/56 |
| 2018/0349684 A1* | 12/2018 | Bapat | G06V 40/173 |
| 2019/0073543 A1 | 3/2019 | Ichinose | |
| 2019/0236374 A1* | 8/2019 | Nakagawa | G06V 40/10 |
| 2020/0193147 A1 | 6/2020 | Kusama | |
| 2021/0192224 A1 | 6/2021 | Nakagawa et al. | |

OTHER PUBLICATIONS

Notice of Allowance dated Jul. 14, 2021, which issued during the prosecution of U.S. Appl. No. 16/687,797.

* cited by examiner

| MOVING IMAGE ID | MOVING IMAGE | IMAGING TIME | IMAGING POSITION |
|---|---|---|---|
| ** | ** | t1 | p1 |
| ** | ** | t2 | p2 |
| ... | ... | ... | ... |

INFORMATION PROCESSING SYSTEM, PROGRAM, AND INFORMATION PROCESSING METHOD

INCORPORATION BY REFERENCE

This application is a continuation of U.S. application Ser. No. 16/687,797, filed Nov. 19, 2019 (allowed), which claims priority to Japanese Patent Application No. 2018-234145 filed on Dec. 14, 2018. The entire disclosures of the prior applications are considered part of the disclosure of the accompanying continuation application, and are hereby incorporated by reference.

BACKGROUND

1. Technical Field

The disclosure relates to an information processing system, a program, and an information processing method.

2. Description of Related Art

In the related art, a technique of detecting information on a person from an image of an onboard camera is known. For example, Japanese Patent Application Publication No. 2017-211888 (JP 2017-211888 A) discloses an image information authentication system that receives comparison data such as digital photograph data of a person with a risk of wandering due to dementia from an interested party, registers the received comparison data, captures a scene outside a vehicle with an onboard camera, compares image information acquired from the onboard camera as authentication data with the comparison data, and notifies the interested party of a result of comparison.

SUMMARY

However, in the related art, since comparison data for a person who is detected from a moving image of the onboard camera needs to be registered in advance, a person who has not been registered as comparison data cannot be detected. In this way, convenience of the technique according to the related art cannot be said to be high. Accordingly, there is room for improvement in convenience of the technique of detecting information on a person from an image of an onboard device.

The disclosure is for improving convenience of a technique of detecting information on a person from an image of an onboard camera.

According to an embodiment of the disclosure, there is provided an information processing system including: a plurality of vehicles; and a server that is able to communicate with the plurality of vehicles. Each of the plurality of vehicles performs: generating a moving image in which a person outside the vehicle appears; and transmitting the moving image and an imaging time and an imaging position of the moving image to the server. The server performs: specifying two or more target moving images in which the same person appears out of a plurality of moving images received from the plurality of vehicles; detecting behavior of the person from the two or more target moving images; estimating attribute information of the person based on the detected behavior; and transmitting the estimated attribute information of the person and the imaging time and the imaging position of at least one of the target moving images to a client.

According to an embodiment of the disclosure, there is provided a program causing an information processing device, which is able to communicate with a plurality of vehicles, to perform: receiving a plurality of moving images, which is generated by the plurality of vehicles and in which a person outside the vehicle appears, and imaging times and imaging positions of the plurality of moving images; specifying two or more target moving images in which the same person appears out of the plurality of moving images; detecting behavior of the person from the two or more target moving images; estimating attribute information of the person based on the detected behavior; and transmitting the estimated attribute information of the person and the imaging time and the imaging position of at least one of the target moving images to a client.

According to an embodiment of the disclosure, there is provided an information processing method which is performed by an information processing system including a plurality of vehicles and a server that is able to communicate with the plurality of vehicles, the information processing method including: causing each of the plurality of vehicles to generate a moving image in which a person outside the vehicle appears; causing each of the plurality of vehicles to transmit the moving image and an imaging time and an imaging position of the moving image to the server; causing the server to specify two or more target moving images in which the same person appears out of a plurality of moving images received from the plurality of vehicles; causing the server to detect behavior of the person from the two or more target moving images; causing the server to estimate attribute information of the person based on the detected behavior; and causing the server to transmit the estimated attribute information of the person and the imaging time and the imaging position of at least one of the target moving images to a client.

With the information processing system, the program, and the information processing method according to the embodiment of the disclosure, it is possible to improve convenience of a technique of detecting information on a person from an image of an onboard camera.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, an embodiment of the disclosure will be described.

(Configuration of Information Processing System)

Figure 1:
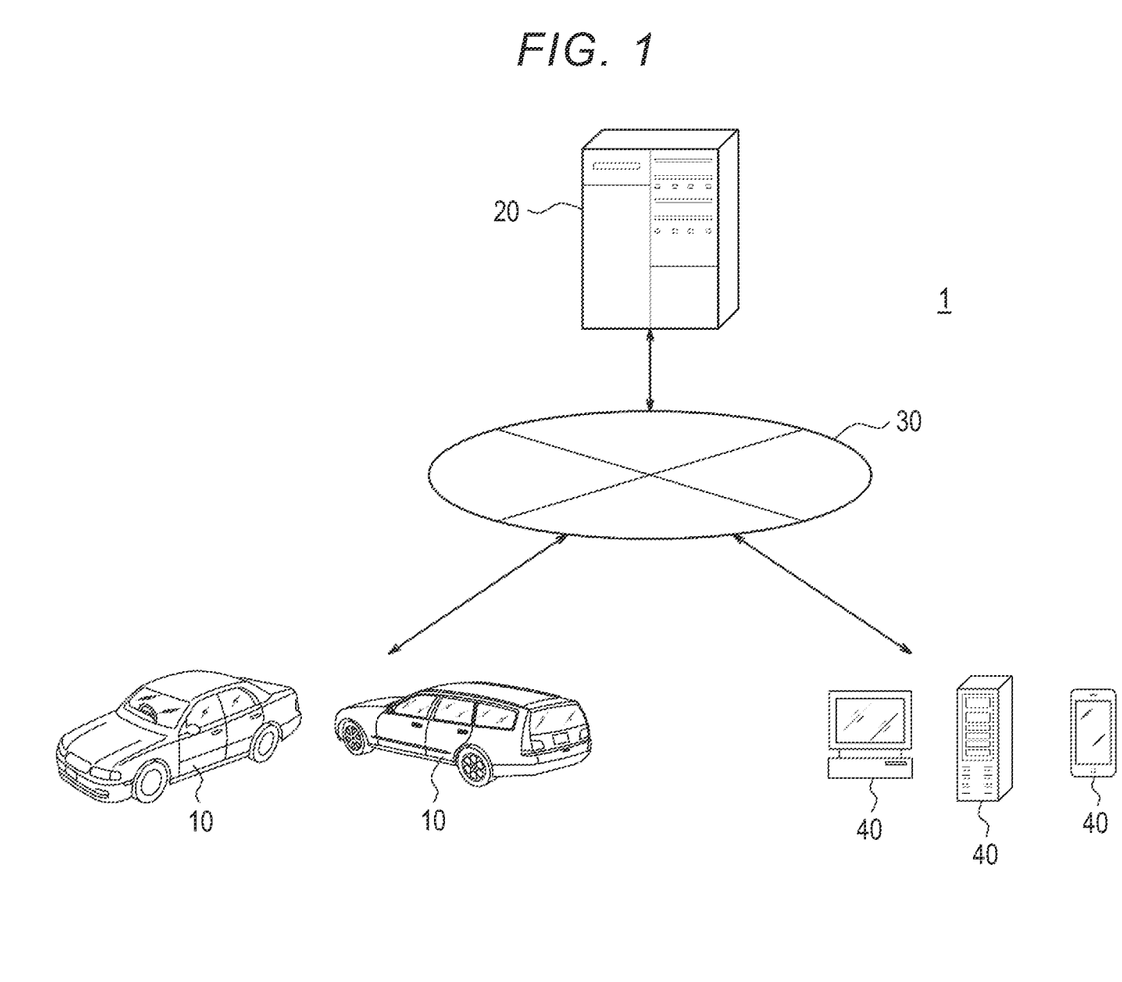
FIG. 1 is a diagram schematically illustrating a configuration of an information processing system according to an embodiment of the disclosure.

An outline of an information processing system 1 according to an embodiment of the disclosure will be described below with reference to FIG. 1. The information processing system 1 includes a plurality of vehicles 10 and a server 20. Each vehicle 10 is, for example, an automobile, but is not limited thereto and may be an arbitrary vehicle. In FIG. 1, for the purpose of convenience of explanation, two vehicles 10 are illustrated, but the information processing system 1 may include an arbitrary number of vehicles 10. The server 20 includes one information processing device (for example, a server device) or a plurality of information processing devices that can communicate with each other. The vehicle 10 and the server 20 can communicate with each other, for example, via a network 30 including a mobile communication network and the Internet. The server 20 can communicate with a client 40 via the network 30. The client 40 is, for example, a personal computer (PC), a server device, or a smartphone, but may be an arbitrary information processing device.

The outline of this embodiment will be first described below and details thereof will be described later. The information processing system 1 is used, for example, to detect a wandering person or a suspicious person. Each of the plurality of vehicles 10 includes, for example, an onboard camera and generates a moving image by capturing a scene outside the vehicle. For example, a person such as a pedestrian who is near the vehicle 10 may appear in the moving image. When a moving image is generated by imaging a person outside the vehicle, each vehicle 10 transmits the moving image, and an imaging time and an imaging position of the moving image to the server 20.

The server 20 specifies two or more moving images in which the same person appears out of a plurality of moving images which is generated by the plurality of vehicles 10 as target moving images. Hereinafter, the same person appearing in the target moving images is also referred to as a target person. Here, it is known that a person such as a wandering person or a suspicious person exhibits characteristic behavior different from those of other persons. Accordingly, whether a wandering person or a suspicious person is applicable can be determined based on behavior of a person. The server 20 detects behavior of a target person from the two or more target moving images and estimates attribute information of the target person (for example, whether the target person corresponds to a wandering person or a suspicious person) based on the detected behavior. Then, the server 20 transmits the estimated attribute information of the target person and imaging times and imaging positions of the target moving images to the client 40.

In general, in order to detect behavior of a person from a moving image of the person, a series of motions of the person needs to appear in the moving image. However, for example, when each vehicle 10 images a person while traveling, the length of each moving image is relatively short and only a part of a series of motions of a person appears in one target moving image. Accordingly, detection accuracy for behavior of a person from one target moving image may not be satisfactory or behavior may not be detected from the target moving image. On the other hand, according to this embodiment, two or more target moving images in which the same person appears are specified out of a plurality of moving images which is generated by a plurality of vehicles 10 as described above. Even when only a part of a series of motions of a person appears in each target moving image as described above, a series of motions of a person can be detected from two or more target moving images. That is, detection accuracy for behavior of a target person is improved using two or more target moving images. Improvement in detection accuracy for behavior of a target person causes improvement in estimation accuracy for attribute information of the target person. Accordingly, it is possible to improve convenience of a technique of detecting information on a person from an image of the onboard camera.

Elements of the information processing system 1 will be described below in detail.

(Configuration of Vehicle)

Figure 2:
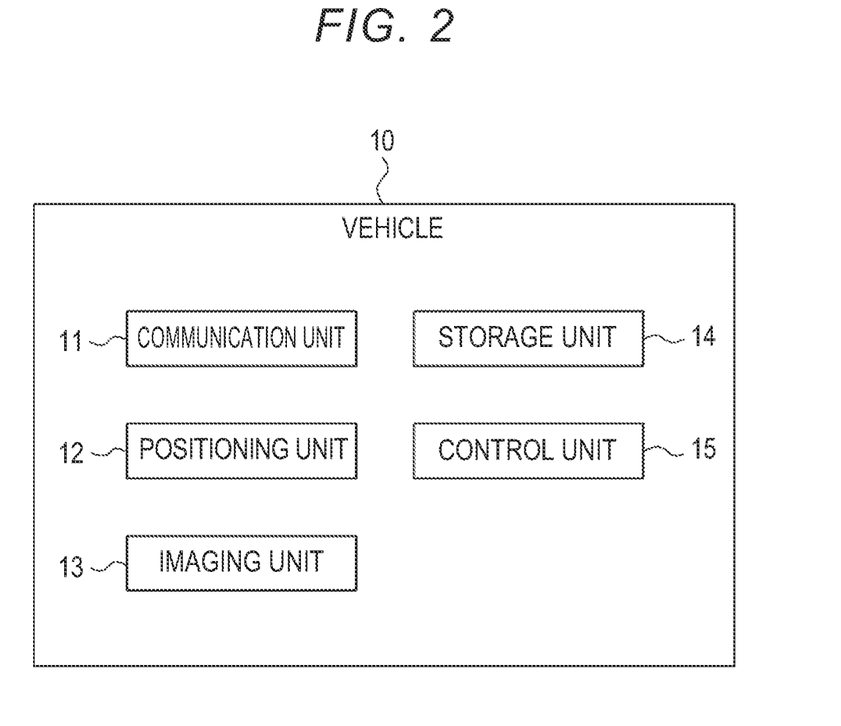
FIG. 2 is a block diagram schematically illustrating a configuration of a vehicle.

As illustrated in FIG. 2, each vehicle 10 includes a communication unit 11, a positioning unit 12, an imaging unit 13, a storage unit 14, and a control unit 15. The communication unit 11, the positioning unit 12, the imaging unit 13, the storage unit 14, and the control unit 15 may be incorporated into the vehicle 10 or may be detachably provided in the vehicle 10. The communication unit 11, the positioning unit 12, the imaging unit 13, the storage unit 14, and the control unit 15 are communicatively connected to each other, for example, via an onboard network such as a controller area network (CAN) or a dedicated line.

The communication unit 11 includes a communication module that is connected to the network 30. The communication module corresponds to a mobile communication standard such as 4th generation (4G) and 5th generation (5G), but is not limited thereto and may correspond to an arbitrary communication standard. For example, an onboard communication device such as a data communication module (DCM) may serve as the communication unit 11. In this embodiment, the vehicle 10 is connected to the network 30 via the communication unit 11.

The positioning unit 12 includes a receiver corresponding to a satellite positioning system. The receiver corresponds to, for example, a global positioning system (GPS), but is not limited thereto and may correspond to an arbitrary satellite positioning system. For example, a car navigation device may serve as the positioning unit 12. In this embodiment, the vehicle 10 acquires position information of the host vehicle using the positioning unit 12.

The imaging unit 13 includes an onboard camera that generates a moving image by imaging a subject in a view. The onboard camera may be a monocular camera or a stereoscopic camera. The imaging unit 13 is provided in the vehicle 10 such that a scene outside the vehicle can be captured. For example, an electronic device having a camera function such as a drive recorder or a smartphone which is used by an occupant may serve as the imaging unit 13. In this embodiment, the vehicle 10 generates a moving image in which a scene outside the vehicle is captured using the imaging unit 13.

The storage unit 14 includes one or more memories. In this embodiment, each memory may be, for example, a semiconductor memory, a magnetic memory, or an optical memory, but is not limited thereto. Each memory included in the storage unit 14 may serve as, for example, a main storage device, an auxiliary storage device, or a cache storage device. The storage unit 14 stores arbitrary information which is used for operation of the vehicle 10. For example, the storage unit 14 may store a system program, an application program, and embedded software. Information stored in the storage unit 14 may be updated, for example, based on information which is acquired from the network 30 via the communication unit 11.

The control unit 15 includes one or more processors. In this embodiment, a "processor" is a general-purpose processor or a dedicated processor specialized in a specific process, but is not limited thereto. An electronic control unit (ECU) which is mounted in the vehicle 10 may serve as the control unit 15. The control unit 15 has a clocking function of acquiring a current time. The control unit 15 controls the whole operation of the vehicle 10.

For example, the control unit 15 generates a moving image by capturing a scene outside the vehicle using the imaging unit 13. As described above, for example, a person such as a pedestrian who is near the vehicle 10 may appear in the moving image. When a scene in which a person outside the vehicle appears is detected by image recognition while capturing a moving image, the control unit 15 may generate a moving image in which the person outside the vehicle appears by cutting out the scene. An arbitrary image recognition technique such as pattern matching, feature point extraction, or machine learning can be employed to detect a scene in which a person outside the vehicle appears. When a moving image in which a person outside the vehicle is captured is generated, the control unit 15 transmits the moving image and an imaging time and an imaging position of the moving image to the server 20 via the communication unit 11. The imaging time is, for example, a time at which capturing of the moving image has been started, but may be an arbitrary time in a period from a time point at which capturing of the moving image has been started to a time point at which the capturing has been ended. The imaging position is a position of the vehicle 10 at the imaging time and is acquired from the positioning unit 12.

(Configuration of Server)

Figure 3:
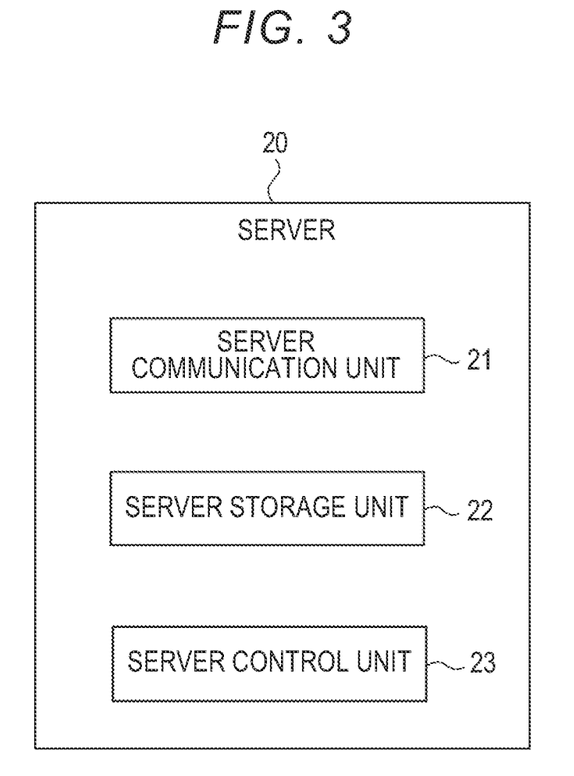
FIG. 3 is a block diagram schematically illustrating a configuration of a server.

As illustrated in FIG. 3, the server 20 includes a server communication unit 21, a server storage unit 22, and a server control unit 23.

The server communication unit 21 includes a communication module that is connected to the network 30. For example, the communication module corresponds to a wired local area network (LAN) standard, but is not limited thereto and may correspond to an arbitrary communication standard. In this embodiment, the server 20 is connected to the network 30 via the server communication unit 21.

The server storage unit 22 includes one or more memories. Each memory included in the server storage unit 22 may serve as, for example, a main storage device, an auxiliary storage device, or a cache storage device. The server storage unit 22 stores arbitrary information which is used for operation of the server 20. For example, the server storage unit 22 may store a system program, an application program, and a database. Information which is stored in the server storage unit 22 may be updated with, for example, information which is acquired from the network 30 via the server communication unit 21.

The server control unit 23 includes one or more processors. The server control unit 23 controls the whole operation of the server 20.

Figure 4:
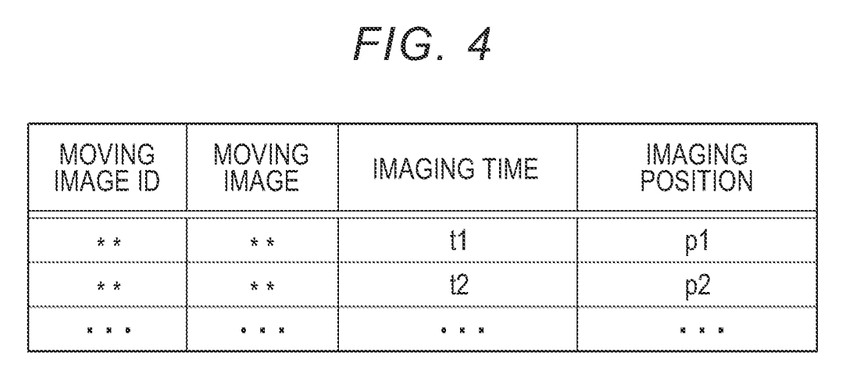
FIG. 4 is a diagram illustrating an example of information which is stored in the server.

For example, when a moving image, an imaging time, and an imaging position are received from a vehicle 10, the server control unit 23 stores the received information in a database of the server storage unit 22. For example, as illustrated in FIG. 4, the server control unit 23 may store a moving image, an imaging time, and an imaging position in the database in correlation with a moving image ID. The moving image ID is information for allowing the server control unit 23 to uniquely identify a moving image and is automatically generated, for example, when a moving image is received. In the example illustrated in FIG. 4, two moving images including a moving image captured at an imaging time t1 and an imaging position p1 and a moving image captured at an imaging time t2 and an imaging position p2 are stored. However, a plurality of moving images which is received from a plurality of vehicles 10 may be stored in the database.

The server control unit 23 selects two or more moving images in which the same person appears out of the plurality of moving images stored in the database of the server storage unit 22, and specifies the selected moving images as target moving images. Specifically, the server control unit 23 detects persons who appear in the moving images stored in the database by image recognition and selects two or more moving images in which the same person appears by determining identity of the detected persons. For example, an arbitrary image recognition technique such as pattern matching, feature point extraction, or machine learning may be employed to detect persons who appear in the moving images and to determine identify thereof.

At the time of selection of the moving images, the server control unit 23 may select two or more moving images in which the same person appears out of a plurality of moving images of which imaging times and imaging positions match in a predetermined range among the plurality of moving images stored in the database. Specifically, the server control unit 23 selects two or more moving images in which the same person appears by specifying a plurality of moving images of which imaging times and imaging positions match in a predetermined range based on the imaging times and the imaging positions of the moving images stored in the database, detecting persons who appear in the specified moving images by image recognition, and determining identity of the detected persons.

Here, the "plurality of moving images of which imaging times and imaging positions match in a predetermined range" is a plurality of moving images in which a difference in imaging time is equal to or less than a reference value (for example, 1 minute) and a difference in imaging position is equal to or less than a reference value (for example, 60 m) in relationships between the moving images and at least one other moving image.

According to this configuration, all the moving images stored in the database do not need to be subjected to detection of a person and determination of identity and thus a process load is decreased. The "predetermined range" may be determined, for example, based on experimental results or experimental rules. For example, as the "predetermined range" becomes narrower, an effect of decrease in process load becomes larger and it is more difficult to specify two or more target moving images. On the other hand, as the "predetermined range" becomes broader, it is easier to specify two or more target moving images and an effect of decrease in process load becomes smaller.

The server control unit 23 detects behavior of a target person from the specified two or more target moving images. A series of motions of a target person in terms of an arbitrary viewpoint can be detected as behavior. For example, a series of motions of parts of a body such as a sight line, an expression, change of a face direction, change of a body direction, or motions of hands and legs of a target person or combinations thereof may be detected as the behavior. For example, a series of composite motions of a body such as running, stopping, bending, or a combination thereof may be detected as the behavior. For example, an arbitrary image recognition technique such as pattern matching, feature point extraction, or machine learning can be employed to detect behavior of a person.

The server control unit 23 estimates attribute information of the target person based on the detected behavior. In this embodiment, attribute information includes information indicating a result of determination of whether a person is a wandering person or a suspicious person. The information indicating what a person is may be, for example, information indicating whether a target person corresponds to a wandering person or a suspicious person or information indicating a likelihood that a target person will correspond to a wandering person or a suspicious person.

An arbitrary technique can be employed to estimate attribute information based on behavior. As described above, it is known that a person such as a wandering person or a suspicious person exhibits characteristic behavior which is different from those of other persons, and whether a person is a wandering person or a suspicious person can be determined based on behavior of the person.

For example, a technique using correspondence information indicating a correspondence relationship between human behavior and attribute information is employed. The correspondence relationship may be determined, for example, based on experimental results or experimental rules. Specifically, the server control unit 23 stores the correspondence information indicating a correspondence relationship between human behavior and attribute information in the server storage unit 22 in advance. The server control unit 23 estimates attribute information corresponding to the behavior detected from two or more target moving images as attribute information of the target person with reference to the correspondence information.

For example, a technique using a result of machine learning of a correspondence relationship between human behavior and attribute information can be employed. Specifically, the server control unit 23 stores a learned model with behavior of a person as input data and with attribute information of the person as output data in the server storage unit 22 in advance. The server control unit 23 inputs the behavior detected from two or more target moving images to the model and estimates output attribute information as attribute information of the target person.

The server control unit 23 acquires information of a spot corresponding to an imaging position of at least one target moving image. Information of a spot corresponding to an imaging position includes, for example, a name, a location, or an image of a facility which is near the spot corresponding to the imaging position, but is not limited thereto and may include arbitrary information on the spot. The information of a spot corresponding to an imaging position may be acquired, for example, from the network 30 via the server communication unit 21 or may be acquired from map information which is stored in the server storage unit 22 in advance.

The server control unit 23 cuts out an image of a target person (a moving image or a still image) from one target moving image. Here, the server control unit 23 may preferentially cut out an image of a scene in which a target person appears out of two or more target moving images.

The server control unit 23 transmits attribute information of a target person, an imaging time and an imaging position of at least one target moving image, information of a spot corresponding to the imaging position, and an image of the target person to the client 40. Transmission of attribute information of a target person or the like may be performed, for example, in response to a request from the client 40 (for example, pull-transmission) or may be performed automatically by the server control unit 23 (for example, push-transmission).

Here, operations including acquisition of information of the spot corresponding to the imaging position, cutting-out of an image of a target person, and transmission of attribute information of the target person may be performed only when the estimated attribute information satisfies a predetermined condition. For example, only when the estimated attribute information indicates that a target person corresponds to a wandering person or a suspicious person or that a likelihood thereof is higher than a predetermined criterion, the operations may be performed.

(Operation Flow of Vehicle)

Figure 5:
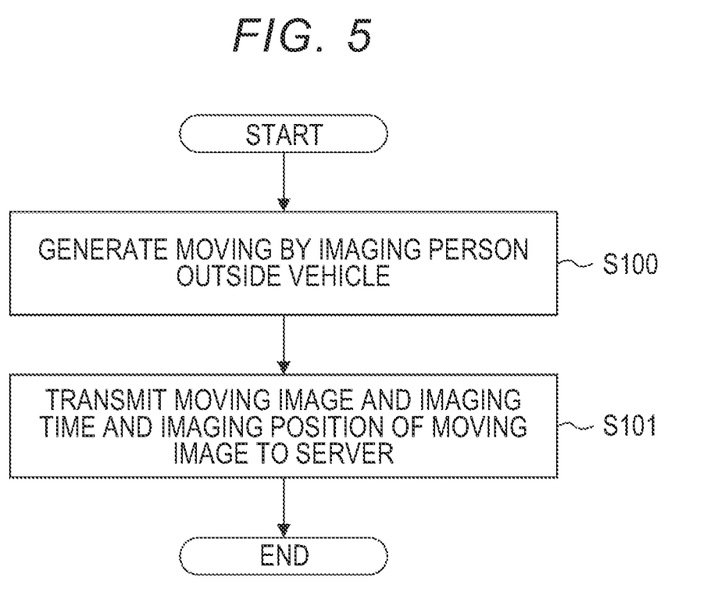
FIG. 5 is a flowchart illustrating an operation of the vehicle.

A flow of operations of the vehicle 10 will be described below with reference to FIG. 5.

Step S100: The control unit 15 generates a moving image in which a person outside the vehicle is captured using the imaging unit 13.

Step S101: The control unit 15 transmits the moving image generated in Step S100 and an imaging time and an imaging position of the moving image to the server 20 via the communication unit 11.

(Flow of Operations in Server)

Figure 6:
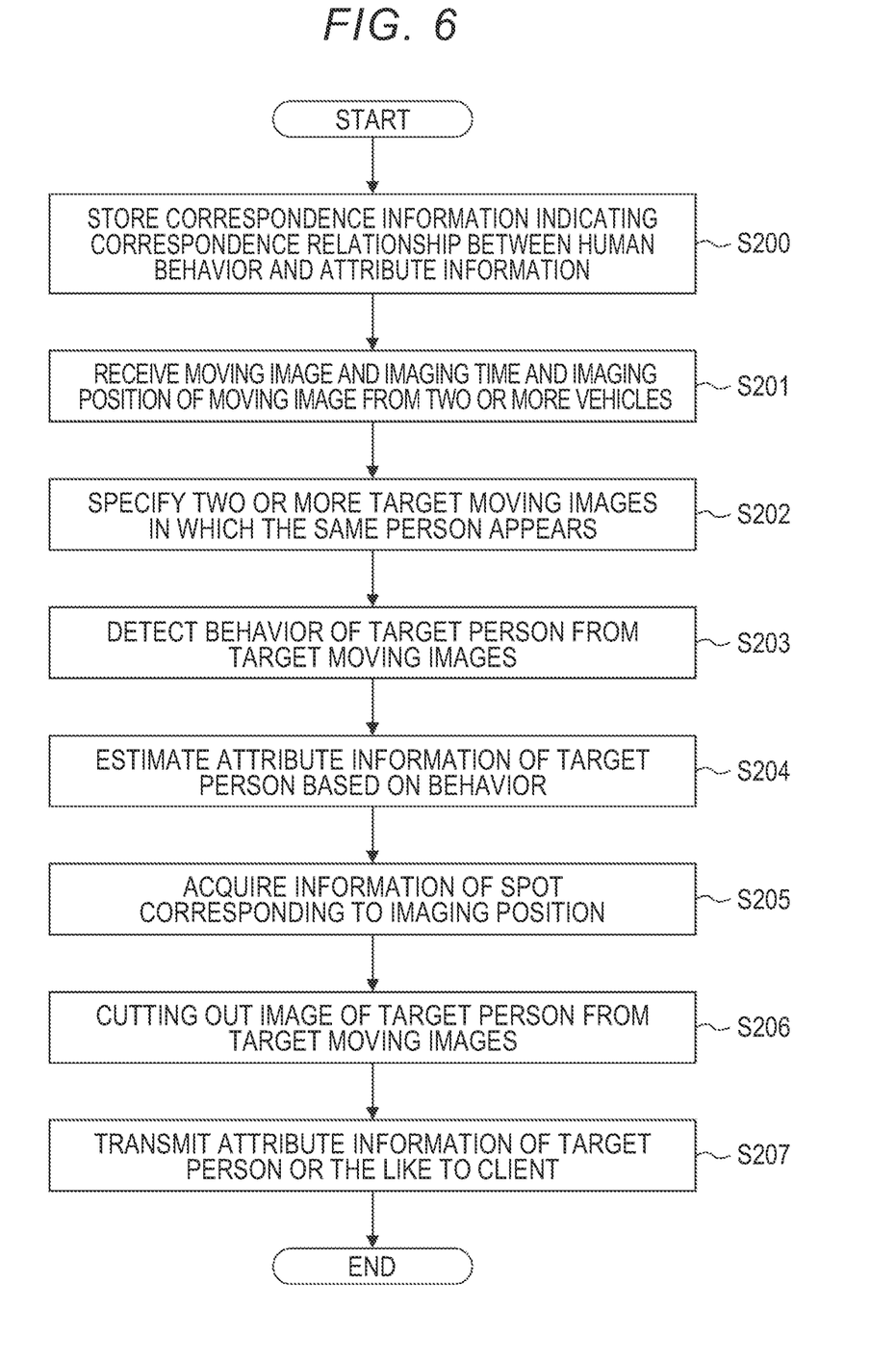
FIG. 6 is a flowchart illustrating an operation of the server.

A flow of operations in the server 20 will be described below with reference to FIG. 6.

Step S200: The server control unit 23 stores correspondence information indicating a correspondence relationship between human behavior and attribute information in the server storage unit 22.

Step S201: The server control unit 23 receives moving images, imaging times, and imaging positions from the vehicles 10 and stores the received data in the database of the server storage unit 22.

Step S202: The server control unit 23 selects two or more moving images in which the same person appears out of a plurality of moving images stored in the database of the server storage unit 22 and specifies the selected moving images as target moving images. At the time of selection of the moving images, the server control unit 23 may select two or more moving images in which the same person appears out of a plurality of moving images in which the imaging times and the imaging positions match in a predetermined range among the plurality of moving images stored in the database.

Step S203: The server control unit 23 detects behavior of a target person from the specified two or more target moving images.

Step S204: The server control unit 23 estimates attribute information of the target person based on the detected behavior. In this example, the server control unit 23 estimates attribute information corresponding to the behavior detected from the two or more target moving images as attribute information of the target person with reference to the correspondence information in Step S200.

Step S205: The server control unit 23 acquires Information of a spot corresponding to the imaging position of at least one target moving image.

Step S206: The server control unit 23 cuts out an image of the target person (a moving image or a still image) from one target moving image.

Step S207: The server control unit 23 transmits the attribute information of the target person, the imaging time and the imaging position of at least one target moving image, the information of the spot corresponding to the imaging position, and the image of the target person to the client 40.

As described above, in the information processing system 1 according to this embodiment, each of a plurality of vehicles 10 generates a moving image in which a person outside the vehicle is captured and transmits the moving image and an imaging time and an imaging position of the moving image to the server 20. The server 20 specifies two or more target moving images in which the same person (a target person) appears out of a plurality of moving images received from the plurality of vehicles 10. The server 20 detects behavior of the target person from the two or more target moving images and estimates attribute information of the target person based on the detected behavior. Then, the server 20 transmits the attribute information of the target person and the imaging time and the imaging position of the at least one target moving image to the client 40.

According to this configuration, since behavior of a target person is detected using two or more target moving images in which the same person appears, detection accuracy for behavior is improved in comparison with a configuration in which behavior of a target person is detected using one target moving image. Improvement in detection accuracy for behavior of a target person causes improvement in estimation accuracy for attribute information of the target person. Accordingly, it is possible to improve convenience of a technique of detecting information on a person from an image of the onboard camera.

While the disclosure has been described above in conjunction with all the drawings and embodiments, it should be noted by those skilled in the art that various modifications and corrections can be made based on the present disclosure. Accordingly, it should be noted that such modifications and corrections are included in the scope of the disclosure. For example, the functions included in the units or the operations can be rearranged as long as doing so does not result in logical inconsistency, and a plurality of units or operations may be combined into one unit or an operation or may be divided.

For example, in the above-mentioned embodiment, attribute information of a target person is estimated using a learned model with behavior of a person as input data and with attribute information of the person as output data. However, the learned model which is used to estimate attribute information of a target person is not limited to the example. For example, attribute information of a target person may be estimated using a learned model with two or more target moving images as input data and with attribute information of the target person as output data.

For example, a general-purpose information processing device such as a smartphone or a computer may be made to serve as the constituent units of the vehicle 10 or the server 20 according to the above-mentioned embodiment. Specifically, a program in which processing details for realizing the functions of the vehicle 10 or the server 20 according to the embodiment are described is stored in a memory of an information processing device and a processor of the information processing device is made to read and execute the program. Accordingly, the disclosure can also be embodied as a program which can be executed by a processor.

What is claimed is:

1. An information processing system comprising:
a plurality of vehicles; and
a server configured to communicate with the plurality of vehicles,
wherein each of the plurality of vehicles is configured to perform:
generating a moving image in which a person outside the vehicle appears; and
transmitting the moving image and an imaging time and an imaging position of the moving image to the server, and
wherein the server is configured to perform:
specifying two or more target moving images in which the same person appears out of a plurality of moving images received from the plurality of vehicles;
detecting behavior of the person from the two or more target moving images;
estimating attribute information of the person based on the detected behavior;
transmitting the estimated attribute information of the person and the imaging time and the imaging position of at least one of the target moving images to a client;
cutting out a moving image or a still image of the person from the two or more target moving images; and
transmitting the cut-out moving image or still image to the client.

2. The information processing system according to claim 1, wherein the attribute information includes information indicating a result of determination of whether a wandering person or a suspicious person is applicable.

3. The information processing system according to claim 1, wherein the server is further configured to perform:
acquiring information of a spot corresponding to the imaging position of the at least one target moving image; and
transmitting the acquired information to the client.

4. The information processing system according to claim 1, wherein the server is further configured to perform:
specifying two or more target moving images in which the same person appears out of a plurality of moving images of which the imaging times and the imaging positions match within a predetermined range among the plurality of moving images received from the plurality of vehicles.

5. A non-transitory storage medium storing instructions that are executable by one or more processors and that cause the one or more processors to perform communication processing with a plurality of vehicles, comprising:
receiving a plurality of moving images, which is generated by the plurality of vehicles and in which a person outside the vehicle appears, and imaging times and imaging positions of the plurality of moving images;
specifying two or more target moving images in which the same person appears out of the plurality of moving images received from the plurality of vehicles;
detecting behavior of the person from the two or more target moving images;
estimating attribute information of the person based on the detected behavior;
transmitting the estimated attribute information of the person and the imaging time and the imaging position of at least one of the target moving images to a client;
cutting out a moving image or a still image of the person from the two or more target moving images; and
transmitting the cut-out moving image or still image to the client.

6. The non-transitory storage medium according to claim 5, wherein the attribute information includes information indicating a result of determination of whether a wandering person or a suspicious person is applicable.

7. The non-transitory storage medium according to claim 5, wherein the one or more processors is further configured to execute communication processing comprising:
acquiring information of a spot corresponding to the imaging position of the at least one target moving image; and
transmitting the acquired information to the client.

8. The non-transitory storage medium according to claim 5, wherein the one or more processors is further configured to execute communication processing comprising:

specifying two or more target moving images in which the same person appears out of a plurality of moving images of which the imaging times and the imaging positions match within a predetermined range among the plurality of moving images received from the plurality of vehicles.

9. An information processing method which is performed by an information processing system including a plurality of vehicles and a server that is configured to communicate with the plurality of vehicles, the information processing method comprising:

generating, by each of the plurality of vehicles, a moving image in which a person outside the vehicle appears;

transmitting, by each of the plurality of vehicles, the moving image and an imaging time and an imaging position of the moving image to the server;

specifying, by the server, two or more target moving images in which the same person appears out of a plurality of moving images received from the plurality of vehicles;

detecting, by the server, behavior of the person from the two or more target moving images;

estimating, by the server, attribute information of the person based on the detected behavior;

transmitting, by the server, the estimated attribute information of the person and the imaging time and the imaging position of at least one of the target moving images to a client;

cutting out, by the server, a moving image or a still image of the person from the two or more target moving images; and transmitting, by the server, the cut-out moving image or still image to the client.

10. The information processing method according to claim 9, wherein the attribute information includes information indicating a result of determination of whether a wandering person or a suspicious person is applicable.

11. The information processing method according to claim 9, further comprising:

acquiring information of a spot corresponding to the imaging position of the at least one target moving image; and transmitting the acquired information to the client.

12. The information processing method according to claim 9, further comprising:

specifying two or more target moving images in which the same person appears out of a plurality of moving images of which the imaging times and the imaging positions match within a predetermined range among the plurality of moving images received from the plurality of vehicles.

13. The information processing system according to claim 1, wherein the server transmits the estimated attribute information in response to a request from the client.

14. The non-transitory storage medium according to claim 5, wherein the one or more processors transmits the estimated attribute information in response to a request from the client.

15. The information processing method according to claim 9, wherein the transmitting of the estimated attribute information is performed in response to a request from the client.

* * * * *